(12) United States Patent
Shi (10) Patent No.: US 7,572,493 B2
(45) Date of Patent: Aug. 11, 2009

(54) LOW IV PET BASED COPOLYMER PREFORM WITH ENHANCED MECHANICAL PROPERTIES AND CYCLE TIME, CONTAINER MADE THEREWITH AND METHODS

(75) Inventor: Yu Shi, Alpharetta, GA (US)

(73) Assignee: The Coca-Cola Company, Atlanta, GA (US)

( * ) Notice: Subject to any disclaimer, the term of this patent is extended or adjusted under 35 U.S.C. 154(b) by 162 days.

(21) Appl. No.: 11/126,960

(22) Filed: May 11, 2005

(65) Prior Publication Data
US 2006/0257602 A1 Nov. 16, 2006

(51) Int. Cl.
*B32B 1/02* (2006.01)
(52) U.S. Cl. .............. 428/35.7; 428/34.1; 428/35.2; 428/35.4; 428/35.5; 428/36.6; 428/36.92
(58) Field of Classification Search ............. 428/34.1, 428/34.8, 35.2, 35.3, 35.4, 35.5, 35.7, 35.8, 428/35.9, 36.4, 36.6, 36.7, 36.9, 36.92
See application file for complete search history.

(56) References Cited

U.S. PATENT DOCUMENTS

| | | | |
|---|---|---|---|
| 3,499,873 A | 3/1970 | Kuehne et al. | |
| 3,654,231 A | 4/1972 | Brozek | |
| 3,960,807 A | 6/1976 | McTaggart | |
| 3,989,664 A | 11/1976 | Kawase et al. | |
| 4,250,078 A | 2/1981 | McFarlane et al. | |
| 4,418,116 A | 11/1983 | Scott | |
| 4,420,581 A | 12/1983 | McFarlane et al. | |
| 4,474,918 A | 10/1984 | Seymour et al. | |
| 4,574,148 A | 3/1986 | Wicker et al. | |
| 4,618,515 A | 10/1986 | Collette et al. | |
| 4,665,682 A | 5/1987 | Kerins et al. | |
| 4,820,795 A | 4/1989 | Hirata et al. | |
| 4,824,882 A | 4/1989 | Nakamura et al. | |
| 4,847,314 A | 7/1989 | Tortorello et al. | |
| 4,882,410 A | 11/1989 | Neugebauer et al. | |
| 5,021,515 A | 6/1991 | Cochran et al. | |

(Continued)

FOREIGN PATENT DOCUMENTS

EP  0135677  4/1984

(Continued)

OTHER PUBLICATIONS

Sakellarides, Stefano, Modifying PET Crystallization To Improve Container Processing, Plastics Engineering 33-35 (Dec. 1996).

(Continued)

*Primary Examiner*—Rena L Dye
*Assistant Examiner*—Walter B Aughenbaugh
(74) *Attorney, Agent, or Firm*—Sutherland Asbill & Brennan LLP (57) ABSTRACT

A preform having a low IV and including a PET Copolymer including a diol component having repeat units from ethylene glycol and diethylene glycol and a diacid component having repeat units from terephthalic acid and naphthalenedicarboxylic acid. The total amount of diethylene glycol and naphthalenedicarboxylic acid is present in the poly(ethylene terephthalate) copolymer in an amount from about 0.1 mole percent to less than 2.8 mole percent. The preform is useful in making containers and corresponding methods are disclosed.

19 Claims, 1 Drawing Sheet

U.S. PATENT DOCUMENTS

| | | | |
|---|---|---|---|
| 5,059,356 | A | 10/1991 | Nakamura et al. |
| 5,067,622 | A | 11/1991 | Garver et al. |
| 5,095,001 | A | 3/1992 | Miles et al. |
| 5,162,091 | A | 11/1992 | Ishii et al. |
| 5,235,027 | A | 8/1993 | Thiele et al. |
| 5,250,333 | A | 10/1993 | McNeely et al. |
| 5,281,387 | A | 1/1994 | Collette et al. |
| 5,283,295 | A | 2/1994 | Light et al. |
| 5,286,557 | A | 2/1994 | Jacob et al. |
| 5,302,686 | A | 4/1994 | Tanaka et al. |
| 5,362,431 | A | 11/1994 | Guerrini et al. |
| 5,378,748 | A | 1/1995 | Katsumata et al. |
| 5,405,565 | A | 4/1995 | Sumida et al. |
| 5,409,967 | A | 4/1995 | Carson et al. |
| 5,409,983 | A | 4/1995 | Jones et al. |
| 5,460,903 | A | 10/1995 | St. Aubyn Hubbard et al. |
| 5,473,161 | A | 12/1995 | Nix et al. |
| 5,475,045 | A | 12/1995 | Baker et al. |
| 5,504,128 | A | 4/1996 | Mizutani et al. |
| 5,506,014 | A | 4/1996 | Minnick |
| 5,573,820 | A | 11/1996 | Harazoe et al. |
| 5,582,788 | A | 12/1996 | Collette et al. |
| 5,614,141 | A | 3/1997 | Sumida et al. |
| 5,631,054 | A | 5/1997 | Hosokawa et al. |
| 5,641,548 | A | 6/1997 | Yamamoto et al. |
| 5,656,719 | A | 8/1997 | Stibal et al. |
| 5,700,554 | A | 12/1997 | Speer et al. |
| 5,728,347 | A | 3/1998 | Collette et al. |
| 5,744,056 | A | 4/1998 | Venkateshwaran et al. |
| 5,798,183 | A | 8/1998 | Hosono et al. |
| 5,888,598 | A | 3/1999 | Brewster et al. |
| 5,925,710 | A | 7/1999 | Wu et al. |
| 5,939,516 | A | 8/1999 | Greaves et al. |
| 5,945,460 | A | 8/1999 | Ekart et al. |
| 5,948,864 | A | 9/1999 | Rajagopalan |
| 5,952,066 | A * | 9/1999 | Schmidt et al. ............ 428/35.9 |
| 5,976,653 | A | 11/1999 | Collette et al. |
| 5,980,797 | A | 11/1999 | Shelby et al. |
| 6,019,933 | A | 2/2000 | Takada et al. |
| 6,060,140 | A | 5/2000 | Sprayberry et al. |
| 6,071,599 | A | 6/2000 | Kosuge et al. |
| 6,077,904 | A | 6/2000 | Dalgewicz et al. |
| 6,099,778 | A | 8/2000 | Nelson et al. |
| 6,150,450 | A | 11/2000 | Sekiyama et al. |
| 6,150,454 | A | 11/2000 | Wu et al. |
| 6,180,749 | B1 | 1/2001 | Kim et al. |
| 6,230,547 | B1 | 5/2001 | Carroll |
| 6,276,994 | B1 | 8/2001 | Yoshida et al. |
| 6,284,866 | B1 | 9/2001 | Schiavone |
| 6,309,718 | B1 | 10/2001 | Sprayberry |
| 6,320,014 | B1 | 11/2001 | Takahishi et al. |
| 6,333,363 | B1 | 12/2001 | Imashiro et al. |
| 6,335,422 | B2 | 1/2002 | Schiavone et al. |
| 6,344,166 | B1 | 2/2002 | Aoki et al. |
| 6,355,319 | B1 | 3/2002 | Nakamachi et al. |
| 6,458,314 | B1 | 10/2002 | Al Ghatta |
| 6,485,804 | B1 | 11/2002 | Nakamachi et al. |
| 6,489,386 | B1 | 12/2002 | Plotzker et al. |
| 7,226,648 | B2 | 6/2007 | Al Ghatta et al. |
| 2002/0010285 | A1 | 1/2002 | Nakamachi |
| 2002/0119267 | A1 | 8/2002 | Himmelmann et al. |
| 2002/0128427 | A1 | 9/2002 | Schaaf et al. |
| 2002/0198331 | A1 | 12/2002 | Nishihara et al. |
| 2003/0001317 | A1 | 1/2003 | Stafford et al. |
| 2003/0099794 | A1 | 5/2003 | Sasaki et al. |
| 2003/0116526 | A1 | 6/2003 | Mehanna |
| 2004/0013893 | A1 | 1/2004 | Nakaya et al. |
| 2004/0091651 | A1 | 5/2004 | Rule |
| 2004/0116619 | A1 | 6/2004 | Moad et al. |
| 2004/0236065 | A1 | 11/2004 | Denis et al. |
| 2005/0100696 | A1 | 5/2005 | Shi et al. |
| 2005/0118371 | A1 | 6/2005 | Shi et al. |
| 2005/0153084 | A1 | 7/2005 | Shi et al. |
| 2005/0260371 | A1 | 11/2005 | Shi et al. |
| 2006/0257603 | A1 | 11/2006 | Shi et al. |

FOREIGN PATENT DOCUMENTS

| | | |
|---|---|---|
| EP | 0356343 | 2/1990 |
| EP | 0395237 | 10/1990 |
| EP | 0415859 | 3/1991 |
| EP | 0532988 | 3/1993 |
| EP | 0554950 | 11/1993 |
| EP | 0678554 | 10/1995 |
| EP | 0707625 | 4/1999 |
| EP | 1433817 | 6/2004 |
| EP | 1518876 | 3/2005 |
| JP | 54154468 | 12/1979 |
| JP | 5255492 | 10/1993 |
| JP | 05293878 | 11/1993 |
| JP | 07268085 | 10/1995 |
| JP | 09076336 | 3/1997 |
| JP | 2002321273 | 11/2002 |
| JP | 2003127211 | 5/2003 |
| JP | 2003159739 | 6/2003 |
| JP | 2003300209 | 10/2003 |
| NL | 1006498 | 1/1999 |
| WO | 98/41559 | 9/1998 |
| WO | 01/56896 | 8/2001 |
| WO | 01/83193 | 11/2001 |
| WO | 2004/041496 | 5/2004 |
| WO | 2004/113414 | 12/2004 |
| WO | 2005/014254 | 2/2005 |

OTHER PUBLICATIONS

Van Krevelen, D. W., "Properties of Polymers: Their Correlation with Chemical Structure; Their Numerical Estimation and Prediction from Additive Group Contributions," Elsevier Science B.V., Third Completely Revised Revision (1997).

"Nylon-MXD6 (PA-MXD6)," posted at the Mitsubishi Chemical Inc.'s Website, date not available.

Maeda, Y., et al., "Effect of Antiplasticization on Gas Sorption and Transport. I. Polysulfone," Journal of Polymer Science: Part B: Polymer Physics, vol. 25, 957-980 (1987).

Maeda, Y., et al., "Effect of Antiplasticization on Gas Sorption and Transport. II," Journal of Polymer Science: Part B: Polymer Physics, vol. 25, 981-1003 (1987).

Maeda, Y., et al., "Effect of Antiplasticization on Gas Sorption and Transport. III," Journal of Polymer Science: Part B: Polymer Physics, vol. 25, 1005-1016 (1987).

Maxwell, et al., "Secondary relaxation processes in polyethylene terephthalate-additive blends: 2. Dynamic mechanical and dielectric investigations," Polymer, vol. 39, Num. 26, 6851-6859 (1998).

Robeson, L. M., et al., "Secondary Loss Transitions in Antiplasticized Polymers," Polymer Science, Part B, vol. 7, 35-40 (1969).

MPS Europe, "Molding of PET Containers," http://www.mps-europe.com/pet-containers.php (Aug. 22, 2008).

International Search Report for PCT/US2005/013226; Filing Date: Apr. 19, 2005.

International Search Report for PCT/US2005/020022; Filing Date: Aug. 6, 2005.

\* cited by examiner

LOW IV PET BASED COPOLYMER PREFORM WITH ENHANCED MECHANICAL PROPERTIES AND CYCLE TIME, CONTAINER MADE THEREWITH AND METHODS

FIELD OF THE INVENTION

This invention relates to preforms and their containers made from a low intrinsic viscosity and low stretch ratio polyethylene terephthalate based resin compositions that possess low levels of diol and diacid modifications.

BACKGROUND OF THE INVENTION

Poly(ethylene terephthalate) and its copolymers, which are commonly referred to in the industry simply as "PET," have been widely used to make containers for carbonated soft drink, juice, water and the like due to their light weight and excellent combination of mechanical and gas barrier properties. When used for carbonated soft drink (CSD) applications, however, a higher molecular weight PET has to be used due to a phenomena called environmental stress cracking.

High molecular weight PET has a high intrinsic viscosity (IV). Traditionally, a minimum IV of 0.80 dL/g is desired in making a CSD container, with preferred IV's being reported to be 0.82 dL/g or higher. Higher IV or higher molecular weight PET has an IV above 0.80 dL/g and fewer chain ends, and is believed to have less interaction with chemical attacking agents, and therefore less stress cracking. In addition, higher IV PET is believed to have more chain entanglement, which can dissipate more stress than lower IV PET.

Higher IV PET, however, requires longer solid state polymerization (SSP) time, and higher injection molding temperature due to higher melt viscosity. The higher injection molding temperature means more degradation of PET during the injection molding and more energy consumption. The higher IV PET is also more expensive to make than lower IV PET. Nevertheless, the general trend in recent years is to use PET having an IV of about 0.84 dL/g or higher to avoid the annoyance of the environmental stress cracking problem, even though higher IV PET costs more to produce and costs more to convert from resin to container. The lower IV PET, although costing less to produce and convert, does not have enough mechanical strength. This is shown not only by the lower stress cracking resistance of the low IV PET, but also in the natural stretch ratio of the PET.

It is well known to those skilled in the art that the natural stretch ratio is an inherent property of PET. The natural stretch ratio of PET depends on the PET composition, the IV of the PET, the stretching temperature, and the stretching rate. Under the same stretching temperature and rate, the natural stretch ratio of PET decreases with an increase in the IV, or molecular weight. It is believed that the decrease is caused by the chain entanglement from the higher molecular weight PET. In container applications, the container is made from an injection blow molding process. A preform is first injection molded and then blow molded into containers either in a one step or two step process.

The natural stretch ratio determines the preform design. When designing a preform, it is important that the stretch ratio of the preform to the corresponding bottle is more than the natural stretch ratio of the polymer such that the polymer can reach and pass the strain hardening point. Only after the PET stretches past the strain hardening point will it start forming the stable orientation and strain induced crystallinity. If the preform is designed such that the polymer does not reach the strain hardening point during blow molding, or just reaches the strain hardening point, the resulting orientation and crystallinity in the bottle will be substantially lower, and the material distribution in the bottle will be more non-uniform. These properties, in turn, not only impact the mechanical properties of the bottle such as the sidewall rigidity and the thermal expansion under pressure, they also affect the gas permeation through the sidewall of the containers, and the shelf life of product stored in the containers. Therefore, it is very important that the preform is designed according to the natural stretch ratio of the polymer.

The stretch ratio as used here is the nomenclature that is well known in the art and is defined as follows:

Stretch ratio=(maximum container diameter/internal preform diameter)×[(height of container below finish)/(height of preform below finish)]

Since higher IV PET has lower natural stretch ratio, a lower stretch ratio preform can be used for higher IV PET. It is also well known to those skilled in the art that the lower stretch ratio preform means a longer or bigger diameter preform with thinner sidewall under the same preform weight. The thinner sidewall means faster cooling during the injection molding (the cooling time is proportional to the square of the sidewall thickness) and shorter cycle time. For a common bottle grade low IV PET that is modified with IPA or CHDM, the preform has to have a higher stretch ratio to mold into containers such as bottles. The higher stretch ratio preform means thicker sidewalls and longer cooling time, which translate into a reduction in productivity. If a preform is designed for the high PET IV, and a low IV is used to mold such preforms, the material will not stretch properly when blowing into bottles and the sidewall crystallinity and orientation will suffer. This will cause an increase in the creep for CSD containers and a decrease in the rigidity of the bottle sidewall.

Thus, there exists a need in the art for a lower IV PET preform that has a conventional configuration normally used for high IV PET, but also is useful for making containers having suitable mechanical properties and stress cracking resistance.

SUMMARY OF THE INVENTION

This invention addresses the above needs by providing a low IV PET copolymer preform having a low stretch ratio such that a traditional high IV PET preform configuration can be used to make containers with the preform despite the lower IV. Normally, a lower IV PET preform would mean the preform would have a higher stretch ratio to form a container with desirable mechanical properties. The preform of the present invention, however, defies convention, and produces a container with desirable mechanical properties even though it has a lower IV and a lower stretch ratio. Because of this unique combination of features, the preform of this invention can be used to make containers at a shorter cycle time than would a PET preform of higher IV.

More particularly, the preform of this invention comprises a poly(ethylene terephthalate) copolymer comprising a diol component having repeat units from ethylene glycol and diethylene glycol and a diacid component having repeat units from terephthalic acid and naphthalenedicarboxylic acid, wherein, based on 100 mole percent of the diol component and 100 mole percent of the diacid component, respectively, the total amount of diethylene glycol and naphthalenedicarboxylic acid present in the PET Copolymer is in an amount from about 0.1 mole percent to less than about 2.8 mole percent. In addition, the preform has an intrinsic viscosity less than 0.77 dL/g. This means that the mole percentage of the diethylene glycol is based on 100 mole percent diol component and the mole percentage of naphthalenedicarboxylic acid is based on 100 mole percent diacid component. This definition is applicable to mole percentages throughout this specification.

This invention also encompasses a container made with the above described preform and methods for making the preform and container.

In addition, this invention encompasses a method for reducing the cycle time for making a container comprising the steps of:

(1) providing a PET Copolymer melt comprising a diol component having repeat units from ethylene glycol and diethylene glycol and a diacid component having repeat units from terephthalic acid and naphthalenedicarboxylic acid, wherein, based on 100 mole percent of the diol component and 100 mole percent of the diacid component, respectively, the total amount of diethylene glycol and naphthalenedicarboxylic acid present in the PET Copolymer is in an amount from about 0.1 mole percent to less than about 2.8 mole percent, (2) then injecting the PET Copolymer into a mold,
(3) then cooling the mold and the contained polymer,
(4) then releasing from the mold a preform having an intrinsic viscosity less than 0.77 dL/g,
(5) then reheating the preform, and
(6) then blow molding the preform into a container;

wherein the cycle time for making the container is reduced as compared to a second cycle time for making a second container with a preform comprising a PET Copolymer and having an intrinsic viscosity of at least 0.77 dL/g.

Other objects, features, and advantages of this invention will become apparent from the following detailed description, drawings, and claims.

DETAILED DESCRIPTION OF EMBODIMENTS

This invention encompasses a low IV PET Copolymer preform having a low stretch ratio as well as a container made with the above described preform and methods for making the preform and container. In addition, this invention encompasses a method for reducing the cycle time for making a container.

According to one embodiment, a PET Copolymer is made into an injection molded preform which is then blow molded into a container. The preform comprises an open ended mouth forming portion, an intermediate body forming portion, and a closed base forming portion. The preform comprises a PET Copolymer comprising a diol component having repeat units from ethylene glycol and diethylene glycol and a diacid component having repeat units from terephthalic acid and naphthalenedicarboxylic acid, wherein the total amount of diethylene glycol and naphthalenedicarboxylic acid is present in the PET Copolymer in an amount from about 0.1 mole percent to about 2.8 mole percent. The mole percentages of diol components and diacid components include all residual comonomers in the PET Copolymer composition such as those formed during or passing through the manufacturing process of the PET Copolymer. In all instances throughout the specification, the PET Copolymer is based on a total of 200 mole percent including 100 mole percent of the diol component and 100 mole percent of the diacid component. This means that the mole percentage of the diethylene glycol is based on 100 mole percent diol component and the mole percentage of the naphthalenedicarboxylic acid is based on 100 mole percent diacid component. This definition is applicable to mole percentages throughout this specification.

The amount of each of the diethylene glycol and naphthalenedicarboxylic acid in the PET Copolymer can vary to some extent within the total amount of both. In preferred embodiments, the total amount of diethylene glycol and naphthalenedicarboxylic acid is present in the poly(ethylene terephthalate) copolymer in an amount from about 1.1 mole percent to about 2.8 mole percent, and more preferably, in an amount from about 1.2 mole percent to about 2.3 mole percent. The diethylene glycol present in the PET Copolymer is preferably in the amount from 1.3 to 2.5 mole percent and more preferably from 1.5 to 2.2 mole percent. The naphthalenedicarboxylic acid present in the PET Copolymer is preferably in the amount from 0.2 to 1 mole percent, preferably from 0.2 to 0.75 mole %, and more preferably from 0.25 to 0.75 mole percent.

The PET Copolymer preform preferably has an intrinsic viscosity (IV), measured according to ASTM D4603-96, of less than 0.77 dL/g, preferably from about 0.6 to less than about 0.77 dL/g, more preferably from about 0.70 to less than about 0.76 dL/g, and even more preferably from about 0.70 to about 0.74 dL/g.

Desirably, the preform of this invention comprises a reaction grade PET Copolymer resin, meaning that the PET resin is a direct product of a chemical reaction between comonomers and not a polymer blend.

The preferred non-terephthalate acid diacid component is 2,6-naphthalenedicarboxylic acid (NDC).

The levels of DEG in PET Copolymers of the present invention range from about 0.1 to about 2.0 mole percent, which is below the typical residual levels of DEG present in the manufacture of conventional PET (hereinafter "Conventional PET"). Conventional PET typically contains from about 2.4 to about 2.9 mole percent DEG, which is equivalent to more commonly referenced weight percent values of about 1.3 to about 1.6. Those skilled in the art of PET manufacture generally regard DEG as a harmless by-product of the polymer manufacture; consequently, little effort has been directed toward reduction of DEG levels in PET intended for use in containers. Thus, modifications to the PET production process for containers must occur to achieve the lower DEG levels in the PET Copolymer used to make the preform of the present invention. Any method suitable for reducing DEG content of polyester can be employed. Suitable methods include reducing the mole ratio of diacid or diester relative to ethylene glycol in the esterification or transesterification reaction; reducing the temperature of the esterification or transesterification reaction, addition of DEG-suppressing additives, including tetra-alkyl ammonium salts and the like; and reduction of the DEG content of the ethylene glycol that is recycled back to the esterification or transesterification reaction.

In embodiments of this invention, despite the low IV and conventional configuration, the preforms have a stretch ratio in the range from about 8 to about 13 when used to make containers, and more desirably from about 8 to about 12. The stretch ratio as used herein refers to the nomenclature that is well known in the art and is defined as follows:

Stretch ratio=(maximum container diameter/internal preform diameter)×[(height of container below finish)/(height of preform below finish)]

The natural stretch ratio is an inherent property of a polymer. The measurement of the free blow volume of a polymer relative to a preform, which is used in the Examples herein, provides a method to measure the natural stretch ratio of a polymer. The natural stretch ratio of a polymer influences the preform design by determining the stretch ratio limitations of a preform used in the blow molding process for making a container. A polymer with a lower natural stretch ratio allows a preform to be designed with a lower stretch ratio. With an understanding of the natural stretch ratio of a polymer, preform dimensions such as height, inside diameter, and wall thickness can be selected so that the preform can be blow molded into a container having certain selected physical properties such as weight, height, maximum diameter, thermal stability, and sidewall rigidity.

In another embodiment of the present invention, a method for reducing the cycle time for making a container comprises the steps of:

(1) providing a PET Copolymer melt comprising a diol component having repeat units from ethylene glycol and diethylene glycol and a diacid component having repeat units from terephthalic acid and naphthalenedicarboxylic acid, wherein, based on 100 mole percent of the diol component and 100 mole percent of the diacid component, respectively, the total amount of diethylene glycol and naphthalenedicarboxylic acid present in the PET Copolymer is in an amount from about 0.1 mole percent to about 2.8 mole percent, (2) then injecting the PET Copolymer into a mold, (3) then cooling the mold and the contained polymer, (4) then releasing from the mold a preform having an intrinsic viscosity less than 0.77 dL/g, (5) then reheating the preform, and (6) then blow molding the preform into a container;

wherein the cycle time for making the container is reduced as compared to a second cycle time for making a second container with a preform comprising a PET Copolymer and having an intrinsic viscosity of at least 0.77 dL/g.

In still another method embodiment, a method for making a preform for use in making containers comprises injection molding a PET Copolymer, which comprises a diol component having repeat units from ethylene glycol and a diethylene glycol and a diacid component having repeat units from terephthalic acid and naphthalenedicarboxylic acid. The total amount of diethylene glycol and naphthalenedicarboxylic acid present in the PET Copolymer is in an amount from about 0.1 mole percent to about 2.8 mole percent and the preform has an intrinsic viscosity less than 0.77 dL/g.

In yet another embodiment, a method for making a container comprises blow molding an injection molded preform having an open ended mouth forming portion, an intermediate body forming portion, and a closed base forming portion, and comprising a PET Copolymer. The PET Copolymer comprises a diol component having repeat units from ethylene glycol and diethylene glycol and a diacid component having repeat units from terephthalic acid and naphthalenedicarboxylic acid. The total amount of diethylene glycol and naphthalenedicarboxylic acid present in the PET Copolymer is in an amount from about 0.1 mole percent to about 2.8 mole percent, and the preform has an intrinsic viscosity less that 0.77 dL/g.

A copending patent application titled "Preform For Low Natural Stretch Ratio PET Copolymer, Container Made Therewith and Methods" and filed on May 11, 2005, the disclosure of which is expressly incorporated herein by reference, discloses a preform having a reduced stretch ratio with certain hoop ratio and axial ratio limitations made from an LNSR polymer having a lower natural stretch ratio over preforms made from PET resin available in the prior art. This reference also discloses a stretch blow molded container having excellent mechanical properties, in particular a beverage container, made from this preform design. Also, this reference discloses a clear container or substantially clear, haze-free or substantially haze free stretch blow molded containers. Furthermore, the low natural stretch ratio polymer is separately disclosed and claimed in copending U.S. patent application Ser. No. 10/967,803 filed in the U.S. Patent and Trademark Office on Oct. 18, 2004, which is a continuation of U.S. patent application Ser. No. 10/696,858 filed in the U.S. Patent and Trademark Office on Oct. 30, 2003, which claims priority under 35 U.S.C. §119 to U.S. provisional patent application Ser. No. 60/423,221 filed on Nov. 1, 2002, the disclosures of which applications are also expressly incorporated herein by reference in their entirety.

In particular, embodiments of this invention are suitable for making containers for packaging applications in the carbonated and non-carbonated soft drink industry and the food industry. PET Copolymer preforms are made by forming the above described polyester compositions into the preform by conventional methods such as melt forming. Suitable melt forming processes include, but are not limited to, injection molding, extrusion, thermal forming and compression molding. The containers are made from the preforms in single stage, two stage, and double blow molding manufacturing systems. Such methods are well known to those skilled in the art and examples of suitable preform and container structures and are disclosed in U.S. Pat. No. 5,888,598, the disclosure of which is expressly incorporated herein by reference in its entirety. The desired end result is clear containers with sufficient mechanical and barrier properties to provide appropriate protection for the contained beverage or food product.

Desirably, a container preform is formed by injection molding the polyester into a preform having a blowable geometric form. The preform or blowable form is then contained within a mold cavity having the volumetric configuration of the desired container and the preform is expanded by blowing it with compressed air within the confines of the mold cavity.

Commercially available equipment, as is used in the manufacture of thin walled single use PET beverage containers, may be used to make the containers in accordance with embodiments of the present invention. In addition, commercial equipment like that used in manufacturing conventional thick wall refillable PET containers may also be used.

In accordance with embodiments of this invention, suitable containers may be blow-molded from a cylindrical injection-molded preform having an open top end and neck finish. The preform may have a tapered shoulder-forming portion, substantially uniform thickness along the sides of the cylinder, and a base-forming portion preferably in a champagne design, but including a hemispherical base with a base cup or a footed design such as a petaloid design. In preferred embodiments, the preform is amorphous and substantially transparent and is injection molded.

In accordance with preferred embodiments of this invention, container preforms are subsequently placed in a blow molding apparatus having an upper mold section which engages the neck finish, a middle mold section having an interior cavity forming the shape of the container side wall, and a lower mold section having an upper surface forming the outwardly concave dome portion of the container base. In accordance with a standard reheat stretch blow mold process, the injection-molded preform is first reheated to a temperature suitable for stretching and orientation of about 70 to 130° C., placed in the blow mold, and an axial stretch rod is then inserted into the open upper end and moved downwardly to axially stretch the preform. Subsequently or simultaneously, an expansion gas is introduced into the interior of the preform to radially expand the shoulder, sidewall and base forming portions outwardly into contact with the interior surfaces of mold sections. The resulting blown container has the same neck finish with outer threads and lowermost neck flange as the preform. The remainder of the bottle undergoes expansion, although to varying degrees. A removable cap is attached to the open upper end of the container. The cap includes a base portion having internal threads which engage the outer threads on the neck finish.

An important consideration in producing clear or transparent containers is to first produce clear or transparent preforms. During the injection molding step thermally induced crystallization can occur in the conversion of the polymer to a preform. Thermally induced crystallization tends to form large crystallites in the polymer, with a concomitant formation of haze. In order to minimize the formation of crystallites and thus have clear preforms, the rate of thermal crystallization needs to be slow enough so that preforms with little or no crystallinity can be produced. However, if the rate of thermal crystallization is too low, the production rates of PET resin can be adversely affected, since PET must be thermally crystallized prior to solid-state polymerization, a process used to increase the molecular weight of PET and simultaneously remove unwanted acetaldehyde. Solid state polymerization increases the molecular weight of the polymer so that a container made from the polymer will have the requisite strength. Prior art techniques for reducing thermal crystallization rate include the use of PET containing a certain amount of co-monomers. The most commonly used comonomer modifiers are isophthalic acid or 1,4-cyclohexanedimethanol, which are added at levels ranging from 1.5 to 3.0 mole percent.

Counterbalancing the need to reduce the rate of thermal crystallization during injection molding is the need to increase the rate of strain-induced crystallinity that occurs during blow molding. Strain-induced crystallinity results from the rapid mechanical deformation of PET, and generates extremely small, transparent crystallites. The amount of crystallinity present in the container sidewall correlates with the strength and barrier performance of the container. Previously, it has been demonstrated that increasing the DEG content of PET from 2.9 to 4.0 mole percent causes an increase in crystallization rates of PET compared to Conventional PET containing between 2.4 to 2.9 mole percent DEG. The rationale for this phenomenon is that the increased polymer chain flexibility resulting from the higher DEG content allows for more rapid ordering and packing of the polymer chains into polymer crystals.

In the PET Copolymer of the present invention both a reduced rate of thermal crystallization and an increased rate of strain-induced crystallization is unexpectedly found to occur by the comonomer modification of NDC and DEG at low amounts. The NDC is believed to reduce the thermal crystallization rate due to the rigidity of the NDC moiety hindering polymer chain flexibility, and thus makes formation of crystallites more difficult. The addition of NDC has also been discovered to enhance the stiffness of the PET chains and results in an unexpected increase in the sidewall rigidity of the containers made from PET Copolymer. Furthermore and contrary to expectations, reducing the DEG content in the PET Copolymer results in an increase in the rate of strain-induced crystallization relative to Conventional PET.

A consequence of this unique combination of low amounts of DEG and NDC, at least in preferred embodiments, is a reduction in the natural stretch ratio of PET Copolymer as compared to that of Conventional PET even when the IV of the PET Copolymer is lowered. Normally, a lower IV PET preform would mean the preform would have a higher stretch ratio to form a container with desirable mechanical properties. The preform of the present invention, however, defies convention, and produces a container with desirable mechanical properties even though it has a lower IV and a lower stretch ratio. Because of this unique combination of features, the preform of this invention can be used to make containers at a shorter cycle time than would a PET preform of higher IV.

Figure 1:
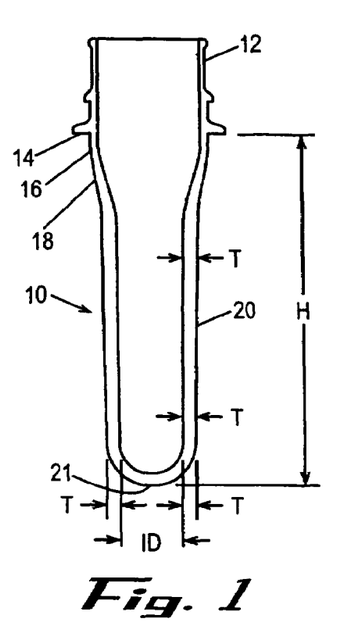
FIG. 1 is a sectional elevation view of an injection molded preform having a conventional configuration, and made with the PET Copolymer in accordance with a preferred embodiment of this invention.

Turning to the FIG. 1, a polyester preform 10 having a conventional configuration is illustrated, but is not drawn to scale. The preform 10 is made by injection molding the PET Copolymer of this invention and comprises a threaded neck finish 12 which terminates at its lower end in a capping flange 14. Below the capping flange 14, there is a generally cylindrical section 16 which terminates in a section 18 of gradually decreasing external diameter so as to provide for an increasing wall thickness. Below the section 18 there is an elongated body section 20. The height of the preform is measured from the capping flange 14 to a closed end 21 of the elongated body section 20.

Figure 2:
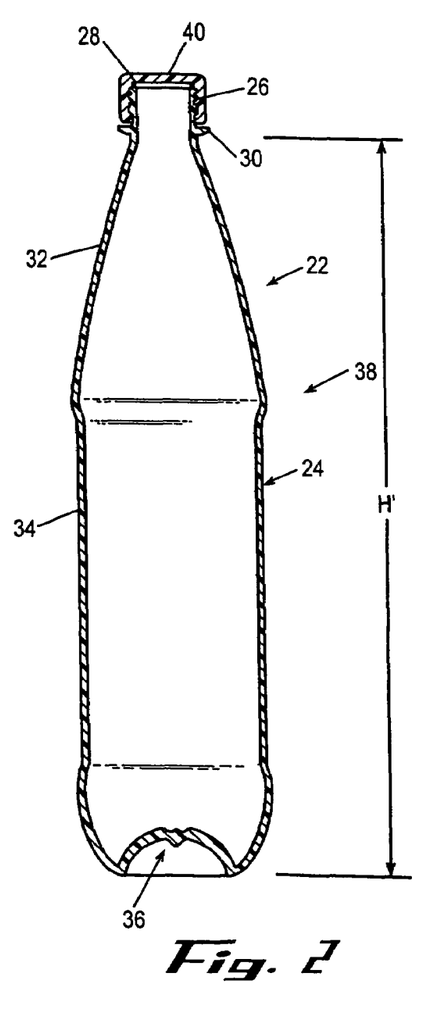
FIG. 2 is a sectional elevation view of a blow molded container made from the preform of FIG. 1 in accordance with a preferred embodiment of this invention.

The preform 10 illustrated in FIG. 1 can be blow molded to form a container 22 illustrated in FIG. 2. The container 22 comprises a shell 24 comprising a threaded neck finish 26 defining a mouth 28, a capping flange 30 below the threaded neck finish, a tapered section 32 extending from the capping flange, a body section 34 extending below the tapered section, and a base 36 at the bottom of the container. The height of the container is measured from the capping flange 30 to a closed end at the base 36. The container 22 is suitably used to make a packaged beverage 38, as illustrated in FIG. 2. The packaged beverage 38 includes a beverage such as a carbonated soda beverage disposed in the container 22 and a closure 40 sealing the mouth 28 of the container.

According to preferred embodiments of this invention, the intermediate body forming portion of the preform has a wall thickness from 1.5 to 8 mm. Furthermore, according to preferred embodiments, the intermediate body forming portion of the preform has an inside diameter from 10 to 30 mm, and the height of the preform, which extends from the closed end of the preform opposite the finish to the finish, is from 50 to 150 mm. Preferably, containers made in accordance with preferred embodiments of this invention have a volume within the range from 0.25 to 3 liters and a wall thickness of 0.25 to 0.65 mm.

In this specification, reference is made to dimensions of the preform 10 and the resulting container 22. The height H of the preform is the distance from the closed end 21 of the preform opposite the finish 12 to the capping flange 14 of the finish. The inside diameter ID of the preform 10 is the distance between the interior walls of the elongated body section 20 of the preform. The wall thickness T of the preform 10 is measured at the elongated body section 20 of the preform also. The height H' of the container 22 is the distance from the closed end of the base 36 of the container opposite the finish 26 to the capping flange 30 of the finish. The maximum container diameter MD is the diameter of the container at its widest point along the height of the container 22. The hoop stretch ratio of the preforms equals the maximum container diameter divided by the internal preform diameter and the axial stretch ratio equals the height of container below the finish divided by the height of preform below the finish. The stretch ratio of the preforms equals the product of the hoop stretch ration and the axial stretch ratio.

The preform 10, container 22, and packaged beverage 38 are but exemplary embodiments of the present invention. It should be understood that a variety of preforms and containers having a variety of configurations can be made in accordance with embodiments of this invention.

The present invention is described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or scope of the appended claims.

EXAMPLE 1

Preforms were made with three different PET copolymer resins. C1, a comparative resin, was a Conventional PET copolymer resin and R1 and R2 were resins made according to embodiments of this invention. The PET resins were dried overnight at 135° C. in a vacuum oven to achieve a moisture level below 50 ppm prior to injection molding. The injection molding was performed with a lab-scale Arburg unit cavity injection machine into conventional preform molds with a stretch ratio about 14. The preforms were then free blown to bubbles to determine the stretch ratio of each polymer. Free blow was performed on each preform variable and the bubbles were blown at temperatures of 100° C. and 105° C. at psi. The stretch ratio of each bubble was measured and recorded.

A detailed description of the sample materials is listed in Table 1.

TABLE 1

Resin description

| Resin composition | IPA (mole %) | NDC (mole %) | DEG (mole %) | Preform IV |
|---|---|---|---|---|
| C1 | 2.8 | 0 | 2.9 | 0.78 |
| R1 | 0 | 0.5 | 1.5 | 0.79 |
| R2 | 0 | 0.5 | 1.5 | 0.76 |

TABLE 2

Areal stretch ratio calculated from free blow bubble

| Resins | Areal stretch ratio | % reduction of the stretch ratio |
|---|---|---|
| C1 | 14.81 | 0 |
| R1 | 11.81 | 20% |
| R2 | 11.23 | 24% |

Table 1 shows that R1 and R2 have the same resin composition, but R2 has lower IV than R1. Table 2 shows that R2 and R1 have similar natural stretch ratios. R2 has a stretch ratio lower than that of R1. At an IV of 0.76, R2 has a stretch ratio lower than that of C1. Therefore, a preform made with R2 resin and with a configuration designed for C1 should have no problem blow molded into a CSD container.

EXAMPLE 2

To further illustrate the stretch ratio of embodiments of this invention having a lower IV, more resins were made as shown in Table 3. The preforms were molded as in Example 1 and free blown. Resins C1 and C2 were Conventional PET copolymer resins and resin R3 was a lower IV PET Copolymer resin having a lower IV. The preforms from C2 and R3 were also blow molded into 500 ml Coca-Cola contour bottles with a Sidel SBO 1 machine.

TABLE 3

Resin description

| Resin composition | IPA (mole %) | NDC (mole %) | DEG (mole %) | Preform IV |
|---|---|---|---|---|
| C1 | 2.8 | 0 | 2.9 | 0.78 |
| C2 | 2.8 | 0 | 2.9 | 0.74 |
| R3 | 0 | 0.3 | 2.0 | 0.73 |

TABLE 4

Areal stretch ratio calculated from free blow bubble

| Resins | Areal stretch ratio | % reduction of the stretch ratio |
|---|---|---|
| C1 | 14.81 | 0 |
| C2 | 15.12 | −2% |
| R3 | 12.55 | 15% |

Table 4 shows that when a normal CSD grade PET is used, a low IV (0.74) does have a slightly higher stretch ratio than the higher IV (0.78) resin. But when resins made according to embodiments of the present invention composition are used, a low IV (0.73) still has a lower stretch ratio than the high IV Conventional PET (0.78). To further demonstrate the effect of the IV, C2 and R3 preforms were blown into bottles as described above. This is contrary to the relationship between IV and stretch ratio for Conventional PET copolymer resins.

To further demonstrate the effect of the IV, C1 and R3 preforms were blown into bottles as described above using the preform configuration designed for Conventional PET copolymer resin C1. The crystallinity of the sidewall was measured on two sets of the bottles using the density column method according to ASTM D 1505-85. The results are shown in Table 5.

TABLE 5

Crystallinity of the bottles

| Resin | Crystallinity |
|---|---|
| C2 | 20.6% |
| R3 | 25.9% |

As it is shown, the bottle made with C2 resin has lower crystallinity than a bottle made with R3 resin, an indication that the comparative resin C2 preform was not fully stretched and a high level of orientation and crystallinity was not achieved using the preform configuration designed for the high IV conventional C2 resin. To further demonstrate this, further test were done on these bottles as shown below.

The thermal stability test was performed according to standard procedure of The Coca-Cola Company as described hereinafter. The thermal stability test is used to measure physical changes in bottle dimensions caused by temperature and pressure stresses. The thermal stability measurements were made as follows:

The "as received" test bottle dimensions and thickness are measured. Bottles are then filled with water carbonated to 4.1+/−0.1 volumes and capped. The filled bottles are exposed to ambient temperature overnight, and the dimensions are measured to determine percent change. The bottles are exposed at 38° C., and the dimensions are measured to determine percent change.

12 test samples are labeled with test request and sample numbers on the bottom half of the bottle using a permanent ink marker. After dimensional measurements are taken at ambient temperature, the samples are stored in the environmental chamber at 38° C. for 24 hours. Measurement of fill point drop, doming and dimensions are completed for filled bottles conditioned after the 38° C. environmental chamber. The minimum, maximum, average, and standard deviation values of all dimensions are calculated for each day of testing. The critical dimensional change was listed in Table 7.

TABLE 6

Thermal stability of bottles

| Resin | Label diameter change % | Filling point drop (in) | Height change % |
|---|---|---|---|
| R3 | 0.86% | 0.839 | 2% |
| C2 | 2.17% | 0.975 | 2% |

As shown in Table 6, the bottles made with comparative C2 resin have worse thermal expansion than those made with R3 resin, indicating the preform designed for comparative resin C1 is not suitable for the low IV C2 resin. The R3 resin, however, can use the preform design for the comparative higher IV C1 resin. In this case, bottles made from the R3 resin met the thermal stability specifications from the Coca-Cola Company, while the bottles made from the C2 resin did not meet the thermal stability specifications.

The sidewall deflection test was done on bottles made with resins C2 and R3 according to a modified ASTM method described hereinafter. The sidewall deflection correlates with the sidewall rigidity. The greater the force required to achieve a specific sidewall deflection, the greater the rigidity of the bottle sidewall.

TABLE 7

Sidewall deflection of bottles

| Resin | Average sidewall deflection (lbf) |
|---|---|
| C2 | 6.46 |
| R3 | 7.88 |

Table 7 shows that bottles made with the low IV R3 resin has higher sidewall rigidity than those made with conventional low IV C2 resin, an indication that the R3 resin makes bottles with higher mechanical strength than bottles made with low IV C2 resin, probably due to the fact that C2 resin is not stretched enough in the higher IV C1 resin preform design to reach high orientation and crystallinity.

Bottles made with the C2 and R3 resins from were subjected to an accelerated stress cracking test as described below. For the accelerated stress crack resistance testing, twenty-five (25) samples of each variable were randomly selected and carbonated to 4.1-4.5 volumes of $CO_2$. The samples were stored for 24 hours in an environment of 72° F.

and 50% RH. The base area of each of these bottles was then immersed in a dilute sodium hydroxide (0.1%) solution. Each bottle was then carefully examined over the course of 3 hours in order to detect carbon dioxide leakage through base cracks or for catastrophic base failure. If any carbonation leakage or base breakage is detected, the time to this failure point is recorded.

TABLE 8

Accelerated stress cracking

| Resin | Average time to failure (hour) | # of bottles pass the 3 hour test |
|---|---|---|
| C2 | 0.56 | 1 |
| R3 | 2.43 | 11 |

As is seen in table 8, the bottles made with C2 resin have very poor stress cracking resistance, while the bottles made with R3 resin have acceptable stress cracking resistance. The data show that C2 resin, as expected with low IV, can not be used for CSD packaging due to the lack of stress cracking resistance. The R3 resin, however, unexpectedly showed higher stress cracking resistance.

EXAMPLE 3

To further demonstrate the benefit of the resins used in accordance with embodiments of this invention, a range of low IV resins (R4, R5, and R6) were made with different compositions as shown in Table 9. The resins were injection molded into a 500 ml preform and free blown as described in Example 1. The volume of the free blow bubble was recorded as an indication of the stretch ratio. The volume is much easier to measure and do not need calculation as compared to the areal stretch ratio.

TABLE 9

Resin description

| Resin | IPA mole % | NDC mole % | DEG mole % | Preform IV |
|---|---|---|---|---|
| C1 | 3.0 | 0 | 2.9 | 0.78 |
| R4 | 0 | 0.4 | 1.5 | 0.74 |
| R5 | 0 | 0.4 | 1.8 | 0.72 |
| R6 | 0 | 0.4 | 2.3 | 0.72 |

TABLE 10

Free blow results

| Resin | Bubble volume (ml) | % reduction |
|---|---|---|
| C1 | 789 | 0 |
| R4 | 636 | 19% |
| R5 | 687 | 13% |
| R6 | 695 | 12% |

Table 10 shows that the low IV (less than 0.75) resins R4, R5, and R6 made in accordance with embodiments of this invention still have lower stretch ratio than the control resin at higher IV (0.78). To further demonstrate the value of resins R4, R5, and R6, they were molded into preforms again as described in the above Example 1 and blown into 500-ml contour bottles.

The resins from Example 3 were injection molded into preforms and then blown into bottles as in Example 1. These bottles were then subjected to thermal stability measurements as in Example 2. The results are shown in table 11.

TABLE 11

Thermal stability results

| Resin | Label diameter change % | Height change % | Fill point drop (in) |
|---|---|---|---|
| C1 | 1.1 | 1.5 | 0.64 |
| R4 | 1.0 | 1.4 | 0.59 |
| R5 | 1.1 | 1.4 | 0.61 |
| R6 | 1.1 | 1.4 | 0.59 |

As can be seen in Table 11, although the preform IV for resins R4 to R6 ranges from 0.72 to 0.74, they perform the same in thermal stability as the comparative resin C1 with a preform IV of 0.78.

It should be understood that the foregoing relates to particular embodiments of the present invention, and that numerous changes may be made therein without departing from the scope of the invention as defined by the following claims.

I claim:

1. A preform having an open ended mouth forming portion, an intermediate body forming portion, and a closed base forming portion, and comprising a PET Copolymer comprising a diol component having repeat units from ethylene glycol and diethylene glycol and a diacid component having repeat units from terephthalic acid and naphthalenedicarboxylic acid, wherein, based on 100 mole percent of the diol component and 100 mole percent of the diacid component, respectively, the total combined amount of repeat units from diethylene glycol and repeat units from naphthalenedicarboxylic acid present in the PET Copolymer is in an amount from about 0.1 mole percent to about 2.8 mole percent, and the preform has an intrinsic viscosity less than 0.77 dL/g and a stretch ratio in the range from about 8 to about 13.

2. A preform as in claim 1 wherein the total combined amount of repeat units from diethylene glycol and repeat units from naphthalenedicarboxylic acid present in the PET Copolymer in an amount from about 1.2 mole percent to about 2.3 mole percent.

3. A preform as in claim 1 wherein the repeat units from the naphthalenedicarboxylic acid are present in the PET Copolymer in an amount from about 0.2 to about 1.0 mole percent.

4. A preform as in claim 1 wherein the repeat units from the naphthalenedicarboxylic acid are present in the PET Copolymer in an amount from about 0.2 to about 0.75 mole percent.

5. A preform as in claim 1 wherein the repeat units from the naphthalenedicarboxylic acid are present in the PET Copolymer in an amount from about 0.25 to about 0.75 mole percent.

6. A preform as in claim 1 wherein the repeat units from the diethylene glycol are present in the PET Copolymer in an amount from about 1.3 to about 2.5 mole percent.

7. A preform as in claim 1 wherein the repeat units from the diethylene glycol are present in the PET Copolymer in an amount from about 1.5 to about 2.2 mole percent.

8. A preform as in claim 1 wherein the repeat units from the naphthalenedicarboxylic acid are present in the PET Copolymer in an amount from about 0.2 to about 1.0 mole percent and the repeat units from the diethylene glycol are present in the PET Copolymer in an amount from 1.3 to about 2.5 mole percent.

9. A preform as in claim 1 wherein the naphthalenedicarboxylic acid is 2,6-naphthalenedicarboxylic acid.

10. A preform as in claim 1 wherein the repeat units from the naphthalenedicarboxylic acid are 2,6-naphthalenedicarboxylic acid and present in the PET Copolymer in an amount from about 0.2 to about 1.0 mole percent and wherein the repeat units from diethylene glycol are present in the PET Copolymer in an amount from about 1.3 to about 2.5 mole percent.

11. A preform as in claim 1 wherein the preform has an intrinsic viscosity within a range from about 0.60 dL/g to less than 0.77 dL/g.

12. A preform as in claim 1 wherein the preform has an intrinsic viscosity less than 0.76.

13. A preform as in claim 1 wherein the preform has an intrinsic viscosity within a range from about 0.70 dL/g to less than 0.76 dL/g.

14. A preform as in claim 1 wherein the preform has an intrinsic viscosity within a range from about 0.70 dL/g to about 0.74 dL/g.

15. A preform as in claim 1 wherein the preform has a stretch ratio in the range from about 8 to about 12.

16. A container made by blow molding the preform of claim 1.

17. A container as in claim 16 wherein the intermediate body forming portion of the preform has a wall thickness from about 1.5 to about 8 mm and an inside diameter from about 10 to about 30 mm, and the preform has a finish, a closed end opposite the finish, and a height from the closed end to the finish of from about 50 to about 150 mm.

18. A container as in claim 16 wherein the container has a volume within the range from about 0.25 to about 3 liters.

19. A container as in claim 16 wherein the container is a bottle, drum, carafe, or cooler.

* * * * *

UNITED STATES PATENT AND TRADEMARK OFFICE
CERTIFICATE OF CORRECTION

PATENT NO. : 7,572,493 B2 Page 1 of 1
APPLICATION NO. : 11/126960
DATED : August 11, 2009
INVENTOR(S) : Yu Shi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 359 days.

Signed and Sealed this

Seventh Day of September, 2010

David J. Kappos
*Director of the United States Patent and Trademark Office*